May 17, 1932. H. McCORNACK 1,859,214
MILKING MACHINE
Filed Aug. 10, 1927 2 Sheets-Sheet 1

INVENTOR
HERBERT McCORNACK
BY
ATTORNEY

May 17, 1932.  H. McCORNACK  1,859,214
MILKING MACHINE
Filed Aug. 10. 1927   2 Sheets-Sheet 2
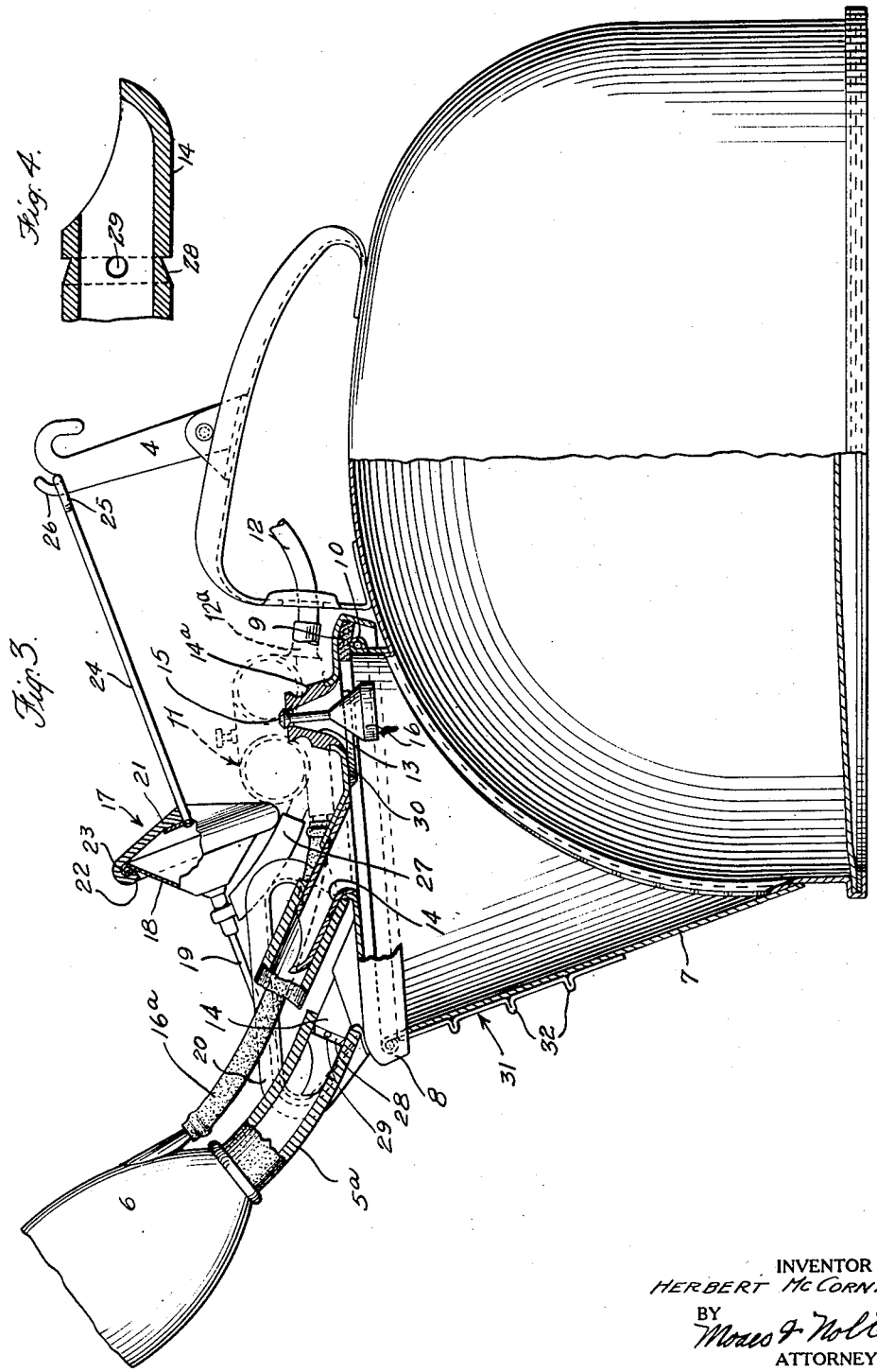
INVENTOR
HERBERT McCORNACK
BY
ATTORNEY Patented May 17, 1932

1,859,214

UNITED STATES PATENT OFFICE

HERBERT McCORNACK, OF GLEN RIDGE, NEW JERSEY

MILKING MACHINE

Application filed August 10, 1927. Serial No. 211,886.

This invention relates to milking machines and is in the nature of an improvement upon the machine disclosed and claimed in my pending application Serial No. 676,241, filed November 22, 1923 for process and apparatus for milking.

The invention is disclosed, and finds its preferred embodiment, in a milking machine of the suspended bucket type but certain features of the invention are applicable to milking machines of other types.

As pointed out in my application referred to above, it is desirable to suspend the bucket in such fashion that the weight of the bucket is borne in part by the teat cups and exerts a downward and forward pull upon the teat cups. This operates to prevent the teat cups from creeping up the teats, swallowing the udder, and causing strangulation. The application of the weight of the bucket through the teat cups to the udder also has the advantage of exerting a pull or tug upon the udder which extends to the very root of the udder and which, if applied as a fluctuating or intermittent pull, has a very beneficial influence in stimulating the production of milk.

It is an important object of the present invention, as of my pending application, referred to above, to provide means for suspending the milk receiving bucket so that it is supported in part from the teats, in combination with means for automatically causing the bucket to swing to and fro and thereby to set up a surging action for agitating the udder and for tugging upon the udder intermittently as the pull thereon is increased.

It is an object of the present invention to provide bucket oscillating means for effecting a regular and positive surging action upon the udder concurrently with, but independently of the surging produced by the teat cups, which means is of such nature that the surging action can be increased or diminished by shifting the milk bucket support upon the back of the cow. The provision of such positively acting means for controlling the surging action is an important feature for the reason that the nature and extent of the surging action is thereby rendered substantially independent of the particular character and conformation of the udder of the individual cow.

In milking machines of a well known class, of which the present illustrative machine is an example, the teat cups comprise outer casings, and rubber inflations therein, which divide the teat cups into inner and outer chambers. Suction is applied continuously to the inner chambers of the teat cups and, through a controlling pulsator, is applied intermittently to the outer chambers of the teat cups, the intermittent application of the suction to the outer chambers of the teat cups being designed alternately to expand and contract the inflations so that the milk passages of the teats are intermittently squeezed closed to relieve the udder of suction.

In the preferred form of the invention, and as illustrated herein, provision is made of a pneumatically operated bucket oscillator, and of means for controlling the oscillator from the pulsator which controls the intermittent application of suction to the outer chambers of the teat cups.

It is a further object of the invention to make provision of means for holding the milk tubes more securely to the cover of the bucket than heretofore, and preferably by utilizing the vacuum in the bucket for this purpose, so that the milk tubes can be disconnected for cleaning, when the bucket is not in use, as easily as before. This feature is also useful in effecting other flexible hose and nipple connections in the vacuum system, as, for example, the connection of the bucket with the hose leading to the source of vacuum.

It is a further object of the invention to provide means for preventing the passage of milk from the bucket into the pulsator and other parts of the vacuum supplying and controlling system. This is desirably accomplished by causing the milk to flow gently into the bucket to prevent churning, and by causing a portion of the milk to fall around the connection of the bucket to the vacuum system so that foam in this vicinity will be beaten down and prevented from mounting to the cover.

Other objects and advantages will hereinafter appear.

In the drawings:

Fig. 3 is a side elevation, partly in section, and partly broken away, on the same scale as Fig. 2, of the milk receiving bucket and the bucket oscillator; and Fig. 4 is a sectional, detail view illustrating one of the bucket nipples.

Figure 1:
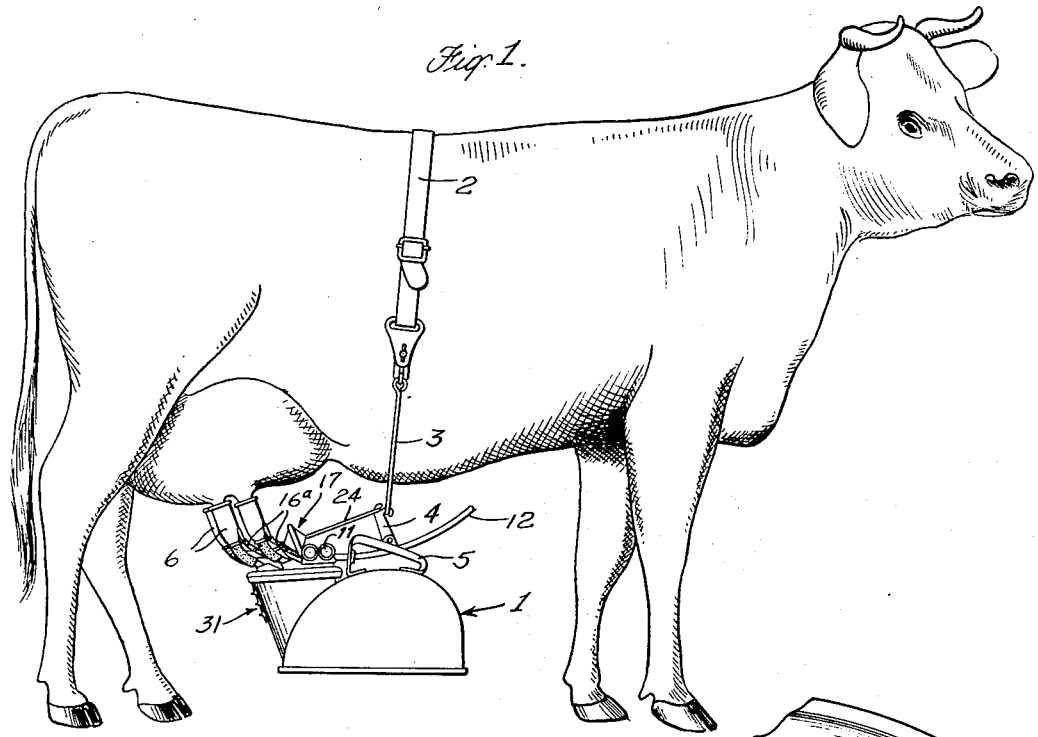
Fig. 1 is a side elevation showing a preferred embodiment of the present invention applied to a cow.
Figure 2:
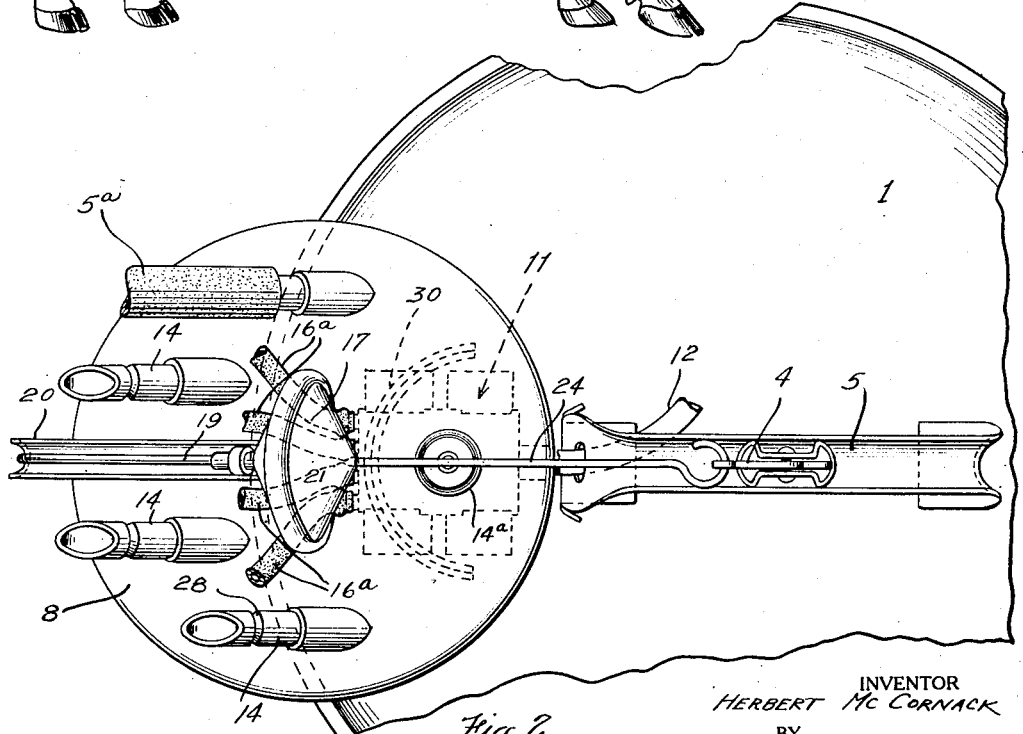
Fig. 2 is a fragmentary plan view of the top of the milk receiving bucket showing the bucket oscillating means applied thereto.

In the illustrative embodiment of the invention the milk bucket 1 is suspended from the cow's back by means of an adjustable strap or surcingle 2 and a metallic bow 3. The bucket is hung on the metallic bow 3 by means of a hooked arm 4 which is pivoted on a bucket handle 5 and is free to swing toward the rear of the bucket but is limited in its forward swinging to the position shown in Fig. 1 by engagement of its tail portion with the handle 5. The pivoted arm 4 is so located that the center of mass of the bucket and of the milk therein, is located behind the point at which the bucket is supported from the bow 3 so that a substantial part of the weight of the bucket is transmitted through the flexible milk tubes 5a and the teat cups 6 to the udder. The bucket is provided at its rear with an upwardly opening spout 7, which spout is closed by a circular flanged cover 8. The cover is held to the bucket by vacuum and gravity, and a tight seal is obtained by means of a gasket ring 9 carried by the cover at the inner marginal portion thereof, which rests upon a rolled upper rim 10 of the spout. The cover 8 carries the usual pulsator mechanism 11 which communicates with a source of steady vacuum through a hose connection 12. The steady vacuum is applied to the interior of the bucket through a passage 13 in the cover thereof and is thence applied through nipples 14 and tubes 5a to the inner chambers of the teat cups. The passage 13, which places the bucket in communication with the source of vacuum, extends through an upwardly projecting conical boss 14a formed on the bucket lid, and is closed at its upper end by a valve 15, which rests upon the boss 14a and which is held to its seat by a bell-shaped pendulous weight 16 carried by the stem of the valve, and of such size at its lower end to extend substantially across the opening at the lower end of the conical boss 14a and shield the same.

The pulsator 11 is connected through tubes 16a with the outer chambers of the teat cups and acts in the usual manner to alternately break and make the suction in said chambers, so that the teats are alternately squeezed and partially released by the teat cup inflations.

The admission of suction to the outer chambers of the teat cups causes expansion of the inflations to relieve the grip of the inflations upon the teats, and the restoration of atmospheric pressure in the outer chambers causes the inflations to be pressed again into gripping relation to the teats to close the milk passages of the teats.

For the purpose of producing a definite and positive surging action of the bucket, provision is made of a bucket oscillator 17. This oscillator comprises a rigid shell 18 which is connected through a stem or link 19 to a handle 20 of the bucket lid 8, the link 19 having a hooked end engaging the curved rear portion of the handle in a channel extending longitudinally of said handle. It further comprises a rubber diaphragm 21 provided with an inturned marginal flange 22 for embracing and gripping a rolled or beaded rim 23 of the shell 18. The diaphragm in conjunction with the shell forms an expansible and collapsible diaphragm chamber. The rubber diaphragm 21 is provided centrally with a forwardly extending stem or link 24 which is provided at its forward end with a hook 25 adapted to be engaged with a hook 26 on the pivoted arm 4. The diaphragm chamber defined by the shell 18 and the diaphragm 21 communicates through a hose connection 27 with the pulsator mechanism 11 so that the suction is alternately made and relieved in said chamber, and the bucket is swung to and fro about the pivot at the lower end of the handle 4.

This arrangement assures the production of a substantially uniform surging action regardless of the weight of the accumulating milk, the number of teat cups in operation, and the peculiarities of the character and conformation of the udder of the individual cow. The extent of such surging action can be increased or diminished at will simply by shifting the surcingle 2 along the back of the cow.

It is desired and intended that the teat cups shall be automatically pulled off of the teats one by one as the respective teats are milked out so that each teat cup can automatically drop to a position to shut the vacuum off from it, as explained in my prior application. The arrangement of the bucket and milk tubes to exert a downward and forward pull upon the teat cups assures this result, and is also effective to prevent the teat cups from creeping up and swallowing the udders, and thereby causing strangulation. A steady downward pull on the teat cups, however, would tend to pull the teat cups off prematurely, or at least to draw them to a disadvantageous position near the lower ends of the teats if a precise balance (which is not attainable) were not maintained between the downward pull of the bucket and the lifting influence of the suction. By providing for regular oscillation of the bucket, however, the teat cups are caused automatically to seek and substantially maintain the most favorable position upon the teats, but do not enclose any part of the udder or press against the udder with objectionable force.

The vacuum in the bucket may also be utilized for holding the milk tubes 5a more securely to the cover of the bucket and this is accomplished preferably by providing a circumferential groove 28 on the outer surface of each nipple 14 and providing an opening or openings 29 connecting the groove with the interior of the nipple so that the suction in the nipple may act to draw the rubber or other material of which the tube 5a is formed into the groove, thereby holding the tube 5a firmly in position. Preferably the groove is formed with an inner wall having a conical surface tapering inwardly away from the cover and with an outer wall in a radial plane, that is, perpendicular to the axis of the nipple. By this construction the material of the rubber tube drawn into the groove is formed into a sharp shoulder in engagement with the similar sharp shoulder formed by the radial face of the groove.

The feature just described is also utilized in the pulsator nipple 12a for the better securement of the hose 12 to the nipple, but since this construction is a duplication of that described in conjunction with the nipples 14, a detailed disclosure is deemed unnecessary.

Frequently in machines of this kind trouble is experienced in preventing some milk from being carried over into the vacuum line. Such trouble may arise from froth churned up by the inflowing milk which is sucked into the vacuum port 13. In carrying out the present invention such disadvantages are avoided or minimized by the acute angle arrangement between the nipples 14 and the lid of the pail and the bell-shape of the nipples at their inner ends which cause the milk to spread over the wall and lid of the bucket and gradually reduce the force of its delivery into the body of the milk, thereby reducing the frothing. Furthermore by arranging a deflecting ring 30 on the lower surface of the lid around the outlet passage or vacuum port 13, the milk which has been slowed down by the skin or surface resistance as it flows over the lower surface of the lid is deflected in a sheet around the vacuum port to dissipate any froth that may be formed on the milk immediately under the vacuum port. Air may thus be drawn out through the vacuum port without entraining froth with it.

Preferably the spout 7 is provided centrally at its outer surface with a reinforcing strip 31 which may be crimped transversely to provide projections 32 which may serve to prevent slipping between the spout and a receptacle into which the milk is being poured from the bucket.

The application to the cow and the operation of the illustrative form of apparatus herein disclosed are similar to those disclosed in my said pending application Serial No. 676,241, except for the addition of the oscillating means.

As has been stated, one of the advantages of the present invention is that it provides means, other than the action of the teat cups, for automatically causing the bucket to oscillate. This renders the periodic swinging of the bucket certain and the stimulation of the udder more thorough. This more positive action effects fuller secretion and flow of the milk and insures faster and more thorough milking of the cow.

It will be observed, however, that besides the swinging of the bucket about the pivot at the lower end of the hooked arm 4, which is produced by the oscillator, the bucket, together with the hooked arm, is free to swing about the hinge connection formed by the hook of arm 4 with the metallic bow 3. The bucket is caused to swing to a certain extent about this upper pivot by the surging of the milk in the bucket, and as this swinging is out of phase with the swinging produced by the oscillator, the resultant motion of the bucket is somewhat irregular. This is a desirable characteristic of the apparatus, because the irregularity more nearly simulates the action of a calf, and therefore stimulates the production of milk.

It will be observed that when the bucket is removed from the cow, the hooked arm 4 may fall flat against the handle 5 and will lie in the channeled upper face thereof where it will be out of the way, and will not interfere with the convenient carrying and manipulation of the bucket by the handle 5.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

Having thus described my invention, I claim:

1. In a milking machine of the character described, the combination with a milk receiving bucket carrying teat cups at one side of the top thereof, of means for supporting said bucket including a link pivotally connected at its lower end to said bucket, means to limit the downward swinging of said teat cup end of the bucket with reference to said link, and oscillator means for automatically swinging the teat cup end of the bucket upward periodically with respect to said link.

2. In a milking machine of the character described, the combination with a milk receiving bucket carrying teat cups at one side of the top thereof, of a supporting device flexibly connected at its lower end to said bucket, a connection between the bucket at the teat cup bearing portion and the suspending device above its connection with said bucket, and means for automatically varying the length of said connection and thereby raising and lowering the teat cup portion of the bucket periodically.

3. In a milking machine of the character described, the combination with a milk receiving bucket carrying teat cups at one side of the top thereof, of a supporting member pivoted to said bucket at the top thereof, a connection between said bucket at the teat cup portion and said supporting member above its pivotal connection with the bucket including links connected with said teat cup portion of the bucket and said supporting member, a bucket oscillator connecting said links, and means for actuating said bucket oscillator at regular intervals.

4. In a milking machine of the character described, the combination with a milk receiving bucket carrying teat cups at one side of the top thereof, of a supporting member pivoted to said bucket at the top thereof, a connection between said bucket at the teat cup portion and said supporting member above its pivotal connection with the bucket including links connected with said teat cup portion of the bucket and said supporting member and a device connecting said links and automatically operable for periodically drawing them together and releasing them.

5. In a milking machine of the character described, the combination with a milk receiving bucket carrying teat cups at one side of the top thereof, and a pulsator, of means for supporting said bucket including a member pivotally connected to said bucket and extending upwardly therefrom, means to limit the downward swinging of said teat cup end of the bucket with reference to said member, and a bucket oscillating device operable by said pulsator and connecting the teat-cup-carrying portion of said bucket with said member.

6. In a milking machine of the character described, the combination with a milk receiving bucket carrying teat cups at one side of the top thereof, and a pulsator, of means for supporting said bucket including a member pivotally connected to said bucket and extending upwardly therefrom, means to limit the downward swinging of said teat cup end of the bucket with reference to said member, and a bucket oscillating device operable by said pulsator and connecting the teat-cup-carrying portion of said bucket with said member, said bucket-oscillating device including a rigid shell and a flexible diaphragm forming an expansible and collapsible diaphragm chamber communicating with said pulsator.

7. In a milking machine of the character described, the combination with a milk receiving bucket carrying teat cups at one side of the top thereof, a pulsator and a handle on said bucket, of means for supporting said bucket including a member pivotally connected at its lower end to said handle at a point forward of the center of gravity of said bucket and having at its lower end a heel to engage said handle and so limit the forward movement of said handle as to prevent undue rearward tipping of said bucket when suspended by a connection with the upper end of said member, and a bucket oscillating device operable by said pulsator and connecting the teat-cup-carrying portion of said bucket with said member near its upper end.

8. In a milking machine of the class described, including a milk receiving bucket, means for evacuating said bucket, and teat cups, in combination, flexible tubes attached to said teat cups for conveying milk to said bucket and for supporting the weight of the bucket in the part from the udder, and means for connecting said tubes with said bucket with capacity for ready separation therefrom including nipples projecting from said bucket into said tubes and provided with peripheral grooves and passages from said grooves to the interior of said nipples to exert suction in said grooves when the bucket is evacuated, to urge the material of said tubes into said grooves so that the tubes are interlocked with the nipples by evacuation of the bucket.

9. In a milking machine of the class described, including a milk receiving bucket, means for evacuating said bucket, and teat cups, in combination, flexible tubes attached to said teat cups for conveying milk to said bucket and for supporting the weight of the bucket in part from the udder, and means for connecting said tubes with said bucket with capacity for ready separation therefrom including nipples projecting from said bucket into said tubes and provided with peripheral grooves and passages from said grooves to the interior of said nipples to exert suction in said grooves when the bucket is evacuated, to urge the material of said tubes into said grooves, so that the tubes are interlocked with the nipples by evacuation of the bucket, said grooves terminating at their outer ends in substantially radial planes.

10. In a milking machine of the class described, including a milk receiving bucket, means for evacuating said bucket, and teat cups, in combination, flexible tubes attached to said teat cups for conveying milk to said bucket and for supporting the weight of the bucket in part from the udder, and means for connecting said tubes with said bucket with capacity for ready separation therefrom including nipples projecting from said bucket into said tubes and provided with peripheral grooves and passages from said grooves to the interior of said nipples to exert suction in said grooves when the bucket is evacuated, to urge the material of said tubes into said grooves, so that the tubes are interlocked with the nipples by evacuation of the bucket, said grooves having inner frustoconical walls tapering inwardly toward the outer ends of the nipples and having radial walls at the outer ends of said grooves.

11. In a milking machine of the character described, the combination with a milk receiving bucket, teat cups flexibly connected to the bucket and arranged to transmit the weight of the bucket to the teats, means for supporting the bucket beneath the cow, means for evacuating the bucket, means including a pulsator connected with the evacuating means for alternately compressing and relieving the teats, and means connected with the pulsator independently of the teat cup connections for exerting an intermittent pull upon the teats.

12. In a milking machine having teat cups, in combination, a milk receiving bucket, a support pivotally suspending the bucket in such fashion that the weight thereof is borne in part by the udder through the teat cups, and an oscillator interposed between the bucket and the support for mechanically swinging the bucket.

13. In a milking machine, in combination, teat cups, a pulsator for intermittently applying suction to the teat cups, a milk receiving bucket, a support pivotally suspending the bucket in such fashion that the weight thereof is borne in part by the udder through the teat cups, a pneumatic oscillator interposed between the bucket and the support for mechanically swinging the bucket, and means placing the oscillator in communication with the pulsator so that the oscillator is controlled by the pulsator.

14. In a milking machine having teat cups, in combination, a milk bucket, a support pivotally suspending the milk bucket in such fashion that the weight of the bucket is borne in part from the udder through the teat cups, an oscillator interposed between the bucket and the support comprising means forming a chamber contractible by suction, and means for alternately connecting said chamber with a source of vacuum and with the atmosphere.

15. In a milking machine having teat cups, in combination, a milk receiving bucket, a supporting member pivotally suspending the bucket in such fashion that the weight thereof is borne in part by the udder through the teat cups, an oscillator interposed between the bucket and the supporting member for mechanically swinging the bucket, and means pivotally suspending said supporting member to enable the bucket, together with said supporting member, to swing pendulously.

16. In a milking machine, a milk bucket, a lid for said bucket having a vacuum port therein, means for evacuating the bucket through said port, means for delivering milk to the bucket including nipples on the lid extending at a slight inclination thereto, the inner ends of the nipples being bell-mouthed and merging smoothly with the under surface of the lid to cause the milk to flow along the under surface of the lid, and a milk deflector on the under surface of the lid around the vacuum port to cause the milk to drop off the lid at said deflector and beat down the foam in the bucket.

In testimony whereof I have affixed my signature to this specification.

HERBERT McCORNACK.